Nov. 3, 1970  A. P. DE FELICE  3,537,140
REMOVING SPRUES IN PLASTIC MOLDS
Filed Dec. 14, 1967  2 Sheets-Sheet 2
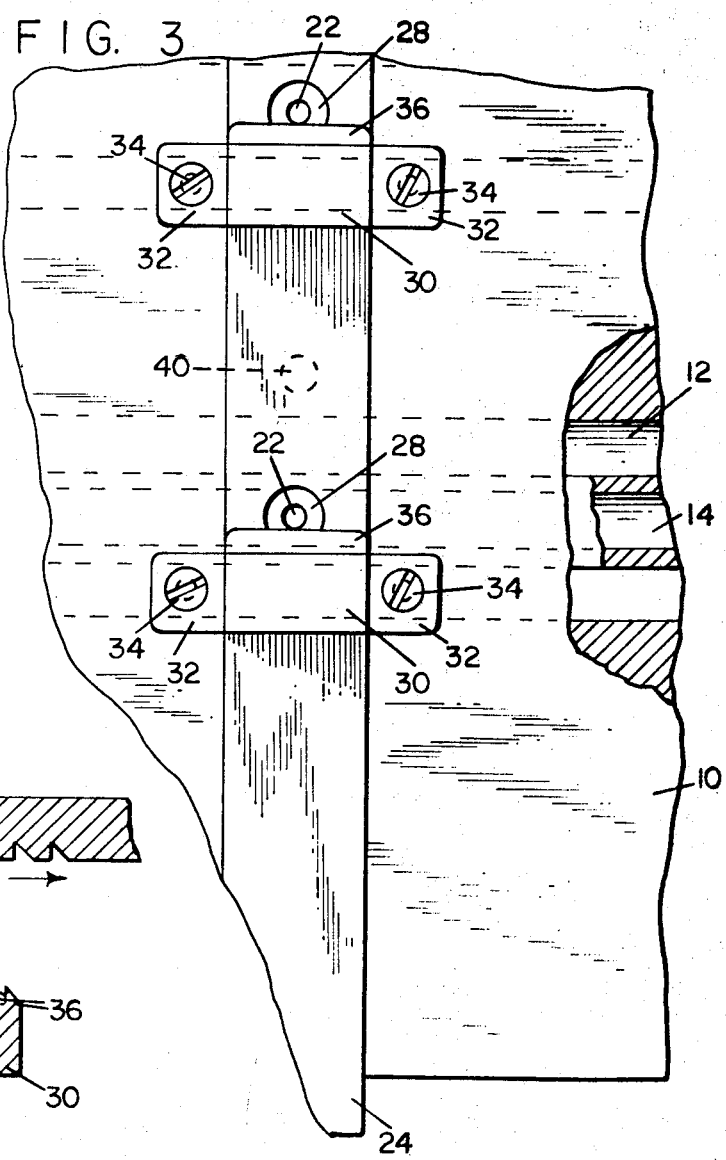
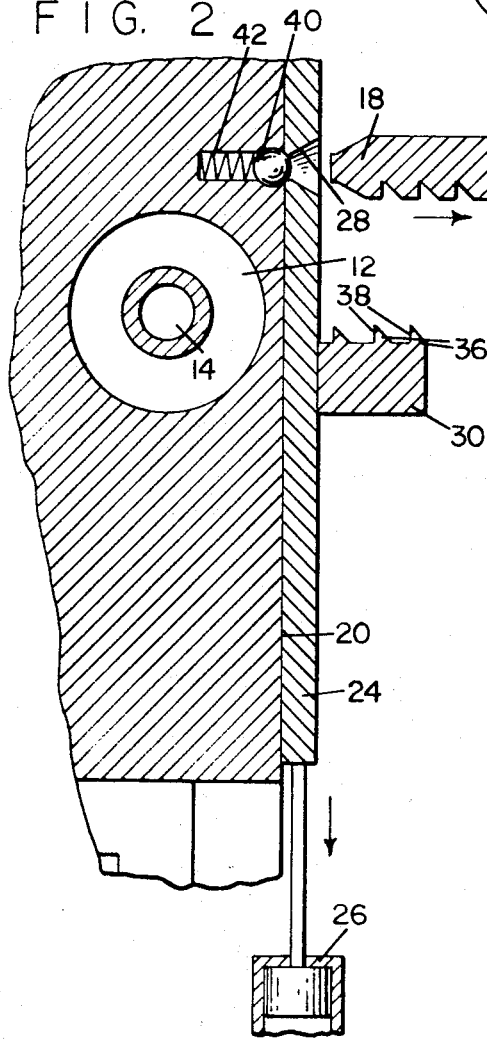
INVENTOR
AMEDIO P. DeFELICE
BY *Charles P. Fay,*
ATTORNEY

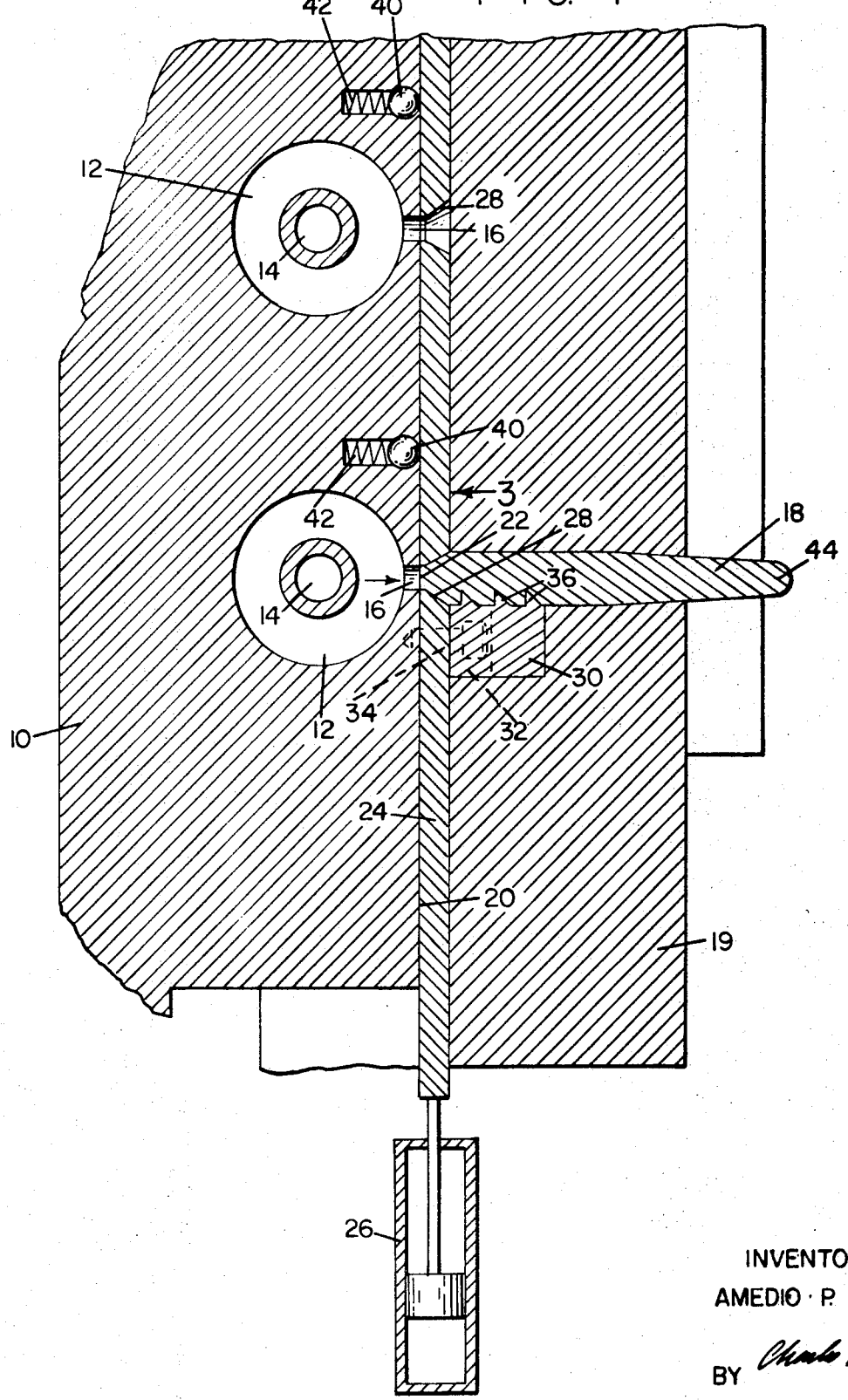

United States Patent Office 3,537,140
Patented Nov. 3, 1970

3,537,140
REMOVING SPRUES IN PLASTIC MOLDS
Amedio P. DeFelice, 105 Union St.,
Leominster, Mass. 01453
Filed Dec. 14, 1967, Ser. No. 690,491
Int. Cl. B29f 1/00
U.S. Cl. 18—30                                              7 Claims

ABSTRACT OF THE DISCLOSURE

A movable cutoff for sprues in plastic molds comprising a blade having an opening therethrough through which the plastic is forced in the molding process, said blade being located closely adjacent the nozzle for the plastic, said blade moving transversely to said nozzle, cutting off the sprue formed in part in the opening, said blade being undercut and holding the cutoff sprue temporarily thereby, in combination with resiliently mounted sprue ejector means which is in the range of motion of said blade and aligned with said opening at the opposite side of the bar from the sprue held in the undercut, thereby forcing the sprue off the blade and discharging it.

---

This invention relates to an improved sprue removal device for plastic molds. As is usual, there are two main mold parts one of which is provided with a source of powder and a nozzle or equivalent thereof for the injection, this mold part having slidably mounted thereon a relatively movable sprue cutoff blade, the other mold part normally forming the main part of the sprue leading to the runner also in the other part. In the present case, when the die parts open, the sprue is left on the nozzle part and means is provided for relatively moving said cutoff blade relative to said nozzle and cutting off the sprue just at the nozzle orifice, the cutoff blade having an aperture therethrough aligned with the nozzle during the molding operation, said opening being undercut and temporarily holding the sprue to the nozzle die part so that as the parts open, the runner part is removed, with the sprue connected to the nozzle part through the blade, whereupon means is operated to move the blade cutting the sprue from the nozzle, and aligning the opening and sprue with an ejection means, said ejection means pressing on the sprue at the opening in the blade in a direction away from the nozzle part, ejecting the sprue.

Other objects and advantages of the invention will appear hereinafter.

Reference is to be had to the accompanying drawings in which:

FIG. 1 is a cross sectional view through a pair of mold parts illustrating the construction of the invention;

FIG. 2 is a similar view showing the runner mold part separated and the blade in sprue ejecting position, and FIG. 3 is a view in elevation looking in the direction of arrow 3 in FIG. 1.

In illustrating the present invention there are shown two die parts which contain the inventive structure but only so much of the mold is shown as is necessary to illustrate the invention. One part is indicated at 10 and in general this contains a heated passage 12 for the plastic powder, this being actually a chamber in the part 10, the chamber having a heating member 14 supported therein, the powder flowing about the same and out through a nozzle 16 where it forms a sprue 18 in the other die part 19. The cavities of the mold are not shown because they are not essential to the present invention except insofar as it is necessary to produce objects by the apparatus disclosed, and die part 10 can be identified as the nozzle part, and die part 19 as the runner part.

The parting line is at 20 and the extreme edge of the nozzle 16 at 22 is in this surface. A reciprocable cutoff blade 24 is slidably mounted on nozzle part 10 and is conveniently operated by a hydraulic cylinder or the like diagrammatically shown at 26, in proper timed relation to the opening of the die parts 10 and 12. The blade 24 is provided with a sprue shearing opening corresponding to the nozzle 16 and the surface of the blade slides across the nozzle orifice at 22 to cut the sprue along the parting line. When the die parts open, the blade 24 of course remains with die part 10. The blade 24 has an undercut portion at 28 aligned with the sprue opening in the blade, and this undercut forms a part of the sprue.

A blade bridging member 30 straddles blade 24, see FIG. 3, and is connected to die part 10. Bridge 30 is spaced from the adjacent surface of die part 10 by end blocks 32 which are fastened to the face of the die part 10 by any kind of fasteners desired as at 34, the blocks 32 lying one at either side of blade 24 which slides between them. The bridge 30 is provided with a series of teeth 36 which preferably have flat faces 38 facing die part 10 and the material of the sprue is molded about these teeth.

Adjacent to the powder chamber 12 there is a detent 40 having a backing spring 42 in a recess in die part 10, this detent normally being held tangent to the parting line 20 by the blade 24 but being urged toward die part 12 by its spring 42.

The molding operation takes place with the parts as illustrated in FIG. 1 and when the injection is completed the die parts 10 and 12 separate breaking off the sprue in the runner part 12, and the situation resembles the FIG. 2 showing. The sprue is broken off approximately at 44 when the die part is open, and is held by the teeth 36 from any tendency to break off in the die part 10, or to move with die part 12. The sprue is sheared off by the edges of the sprue opening in the blade 24 in the area at 22. Blade 24 is then moved by its means 26 as for instance in an upward direction in FIG. 1. The sprue is stripped from teeth 36 and is still held to the blade by the surfaces of the undercut area 28. The blade moves as far as the detent 40, see FIG. 2, and the detent 40 being aligned with the opening in the blade, presses on the end of the sprue held in the undercut portion 28 dislodging it from the blade so that it falls. The blade 24 then returns to the FIG. 1 position, the die parts again close, and the cycle is repeated.

As indicated in FIG. 1, the blade 24 may service a series of nozzles, two being here shown, but there may be as many as may be convenient or practicable in a given set of die parts, and a single blade will operate to remove all the sprue, having a sprue shearing opening for each nozzle.

In addition, the sprue does not touch the heating element for the powder, and this provides a more trouble-free operation, because there are variations in heat during the molding cycle, and this often causes the sprue to stick, in the prior art.

Having thus described my invention and the advantages thereof, I do not wish to be limited to the details herein disclosed, otherwise than as set forth in the claims, but what I claim is:

1. In a plastic mold including at least two parts having a clearly defined parting line, a source of plastic powder in one part, a nozzle therefor, the nozzle terminating adjacent the parting line,
  a movable sprue cutoff blade, said blade having a sprue shearing opening therein aligned with the nozzle in one position thereof and movable to a position where the blade covers the nozzle, said blade being undercut in the region of the opening at the opposite side of the blade, forming a part of a sprue, means secured to said one die part engaging the sprue holding it in position on the one die part when the die parts open, means to move the cutoff blade, said blade shearing the sprue at the orifice of the nozzle and moving the sprue away from said sprue engaging means, and ejection means, said ejection means being aligned with the opening in the cutoff blade and engaging the end of the sprue in the undercut, knocking the sprue from the blade, the blade then returning to original position with the sprue opening in line with the nozzle.

2. The plastic mold of claim 1 wherein said sprue engaging means comprise teeth.

3. The plastic mold of claim 1 wherein said sprue engaging means comprise teeth, said teeth being free-ended and extending in the direction of travel of the cutoff blade from the sprue cutoff position to the sprue ejection position.

4. The plastic mold of claim 1 wherein said sprue engaging means comprise teeth, said teeth being free-ended and extending in the direction of travel of the cutoff blade from the sprue cutoff position to the sprue ejection position, and having faces parallel to said blade, said faces facing the nozzle.

5. The plastic mold of claim 1 wherein said sprue engaging means comprise teeth, said teeth being free-ended and extending in the direction of travel of the cutoff blade from the sprue cutoff position to the sprue ejection position, and having faces parallel to said blade, said faces facing the nozzle, said teeth having angular faces at the sides opposite the said parallel faces.

6. The plastic mold of claim 1 wherein said sprue engaging means includes a bridge, means attaching the bridge to the one die part and straddling the cutoff blade, and sprue engaging teeth on the bridge.

7. The plastic mold of claim 1 wherein the sprue ejection means comprises a spring-pressed detent normally held to the parting line by the blade.

References Cited

UNITED STATES PATENTS 3,121,919  2/1964  Turner _____ 18—30

FOREIGN PATENTS 564,464  11/1932  Germany.
900,748  1/1954  Germany.

H. A. KILBY, Jr., Primary Examiner